US008272772B2

United States Patent
Sato et al.

(10) Patent No.: US 8,272,772 B2
(45) Date of Patent: Sep. 25, 2012

(54) SURFACE ILLUMINATING LIGHT SOURCE DEVICE AND SURFACE ILLUMINATING DEVICE

(75) Inventors: Eiichi Sato, Hachioji (JP); Kenji Fukuoka, Hachioji (JP)

(73) Assignee: Opto Design, Inc. (JP)

( * ) Notice: Subject to any disclaimer, the term of this patent is extended or adjusted under 35 U.S.C. 154(b) by 316 days.

(21) Appl. No.: 12/665,673

(22) PCT Filed: Jun. 20, 2008

(86) PCT No.: PCT/JP2008/001597
§ 371 (c)(1),
(2), (4) Date: Dec. 18, 2009

(87) PCT Pub. No.: WO2009/001532
PCT Pub. Date: Dec. 31, 2008

(65) Prior Publication Data
US 2010/0177535 A1 Jul. 15, 2010

(30) Foreign Application Priority Data
Jun. 22, 2007 (JP) ................................. 2007-164796

(51) Int. Cl.
*F21V 7/04* (2006.01)
(52) U.S. Cl. .................. 362/609; 362/97.1; 362/296.01; 362/341; 362/606; 362/97.3
(58) Field of Classification Search ........ 362/97.1–97.3, 362/235, 259, 296.01, 296.09, 298, 301, 362/341, 606, 609, 612
See application file for complete search history.

(56) References Cited

U.S. PATENT DOCUMENTS
7,290,902 B2 11/2007 Suehiro et al.
(Continued)

FOREIGN PATENT DOCUMENTS
CN 1690811 A 11/2005
(Continued)

OTHER PUBLICATIONS
"International Application Serial No. PCT/JP2008/001597, International Search Report mailed Jul. 15, 2008", 11 pgs.
(Continued)

*Primary Examiner* — Stephen F Husar
*Assistant Examiner* — Meghan Dunwiddie
(74) *Attorney, Agent, or Firm* — Schwegman Lundberg & Woessner, P.A.

(57) ABSTRACT

Uniform illuminating light is obtained on a surface at a prescribed distance from a radiation surface without increasing the thickness in a light radiation direction by using the light from the light source highly efficiently. A surface illuminating light source device is provided with a light source for radiating light; a light guide body propagating light from the light source and having a radiation surface at a prescribed position in the radiation direction; a casing closing the light guide body except the radiation surface and having the light source arranged substantially at the center; an inner reflection section arranged between the casing and the light guide body and having a reflection surface which reflects light propagating inside the light guide body; and a radiation side reflection section having an outer reflection section which is arranged on the radiation surface and has a reflection surface that reflects light propagating inside the light guide body at a prescribed rate and an opening section which is formed on the outer reflection section and through which reflection light reflected at least once on one of the reflection surfaces among the light from the light source passes.

13 Claims, 6 Drawing Sheets

U.S. PATENT DOCUMENTS

| | | |
|---|---|---|
| 2005/0237765 A1 | 10/2005 | Suehiro et al. |
| 2005/0280756 A1 | 12/2005 | Kim et al. |
| 2006/0002148 A1 | 1/2006 | Kim et al. |
| 2007/0058359 A1* | 3/2007 | Saitoh et al. .................... 362/97 |

FOREIGN PATENT DOCUMENTS

| | | | |
|---|---|---|---|
| CN | 1713049 A | 12/2005 |
| EP | 1589590 A2 | 10/2005 |
| EP | 2006-012763 A | 1/2006 |
| JP | 2-183903 A | 7/1990 |
| JP | 8-153405 A | 6/1996 |
| JP | 10-233112 A | 9/1998 |
| JP | 2002-343124 A | 11/2002 |
| JP | 2003-186427 A | 7/2003 |
| JP | 2005-284283 A | 10/2005 |
| JP | 2005-310562 A | 11/2005 |
| JP | 2006-012818 A | 1/2006 |
| JP | 4397728 B2 | 1/2010 |
| KR | 20050123345 A | 12/2005 |

OTHER PUBLICATIONS

"International Application Serial No. PCT/JP2008/001597, International Preliminary Report on Patentability, including Written Opinion, mailed Jan. 7, 2010", (w/ English Translation), 12 pgs.

* cited by examiner

SURFACE ILLUMINATING LIGHT SOURCE DEVICE AND SURFACE ILLUMINATING DEVICE

RELATED APPLICATIONS

This application is a nationalization under 35 U.S.C. 371 of PCT/JP2008/001597, filed Jun. 20, 2008, and published as WO 2009/001532 A1 on Dec. 31, 2008, which claimed priority under U.S.C. 119 to Japanese Patent Application Serial No. 2007-164796 JP, filed Jun. 22, 2007, which applications and publication are incorporated herein by reference and made a part hereof.

TECHNICAL FIELD

The present invention relates to a surface illuminating light source device and a surface illuminating device used for, for example, LCD backlights, illumination boards, panel lights, and a display device for various vehicles or the like.

BACKGROUND ART

Use of light emitting diodes (LEDs) as light sources for display devices, illumination devices, and the like is discussed because LEDs consume less electricity and generate less heat. However, LEDs have high directionality, and thus require ingenuity in order to attain uniform light distribution over a wide area.

For example, Patent Document 1 discloses that a light guide body is included that has a light-incident-end face on which light emitted from a light source is incident and a light emission surface for emitting light to be guided, and the light guide body is provided with a local lens array formed in a direction different from the direction of light with a peak intensity in a brightness distribution at an incident position of the light with the highest intensity of light incident on the light-incident-end face. Thus, the inconsistency in brightness is avoided.

Also, Patent Document 2 discloses that a lamp housing having an opening on one end and having a light source accommodation portion whose inner wall is a light reflection surface; a light emitting diode provided in the light source accommodation portion; and a display plate provided in front of the opening are included. Thus, through diffusing and reflecting, light from the light emitting diode is uniformized.

Also, Patent Document 3 discloses that reflection is repeated between light reflected from a micro reflection section in a diffusion layer formed on a reflection surface of light and a reflector provided in the vicinity of a light emitting diode (LED), thereby uniformized light is obtained.

Also, Patent Document 4 discloses that directional light emitted from an LED (especially intensive light directly above the LED) is reflected in the direction of the LED by using a reflection section formed on a radiation surface. Thus, the direction of the light is changed, and the intensity of the light from the LED is reduced in order to obtain uniformized light.

Patent Document 1: Japanese Patent Application Publication No. 2002-343124
Patent Document 2: Japanese Patent Application Publication No. 2003-186427
Patent Document 3: Japanese Patent Application Publication No. 2005-284283
Patent Document 4: Japanese Patent Application Publication No. 2006-12818

DISCLOSURE OF INVENTION

However, in the technique disclosed in Patent Document 1, in order to uniformize highly directional light emitted from an LED, an LED light source is provided in such a manner that the LED light source is perpendicular to the radiation direction. Accordingly, a large space is required.

In the technique disclosed in Patent Document 2, a prescribed thickness is required in the radiation direction of an LED. Also, the light emitted from an LED is not intended to be utilized entirely. For example, the light scattered by the inner diffusion film is absorbed by a base plate.

Also, in the technique disclosed in Patent Document 3, a reflection plate is provided on a bottom surface around a radiation surface and an LED; however, such a reflection plate is not provided on a side surface. Accordingly, it is not possible to obtain uniform illuminating light while the light emitted from the LED is utilized entirely by reflecting light in a manner of muiltipath reflection in a space surrounding the LED.

Further, the technique disclosed in Patent Document 4 is based on an idea of obtaining uniform illuminating light by controlling propagating paths of light from an LED. In other words, a reflection section on a radiation surface is used for changing the propagating direction. However, this configuration reduces the light intensity, and it is not possible to obtain uniform light by using the effect of multipath reflection.

In view of the above situation, it is an object of the present invention to provide a surface illuminating light source device and a surface illuminating device that can obtain uniform illuminating light on a surface at a prescribed distance from a radiation surface without increasing the thickness in a light radiation direction by using the light from the light source highly efficiently.

To achieve the object, a surface illuminating light source device according to an aspect of the present invention includes: a group of light sources including a single point-light source or a combination of a plurality of point-light sources that emit light; an optically transmissive light guide body propagating light from the light source and having a radiation surface at a prescribed position in the radiation direction; a casing closing surfaces of the light guide body except the radiation surface and having an inner reflection unit formed of a bottom surface and a side reflection section that reflect light, in which the light source is arranged substantially at a center of the bottom surface; and a radiation side reflection unit arranged on the radiation surface. The radiation side reflection unit is formed of a member that reflects or passes light propagating inside the light guide body at a prescribed rate. An opening section is formed on a periphery of the radiation side reflection unit while a central portion of the radiation side reflection unit is a non-opening section so that an amount of light passing through the radiation side reflection unit increases as it gets farther from the center of the radiation surface facing the light source.

Further in the surface illuminating light source device according to the aspect of the present invention, the opening section preferably has a larger area as it gets farther from the non-opening section.

Further in the surface illuminating light source device according to the aspect of the present invention, when proportion of total area of the opening section against a prescribed standard area is opening rate A, b and c are invariables, and distance from a center of the radiation surface facing the light source is x, the opening section preferably satisfies the following formula (I):

$$A = bx^2 + c \qquad (1).$$

Further in the surface illuminating light source device according to the aspect of the present invention, the light guide body is preferably air.

Further, in the surface illuminating light source device according to the aspect of the present invention, the inner reflection unit and the radiation side reflection unit may be formed of an ultrafinely foamed reflection plate.

Further, in the surface illuminating light source device according to the aspect of the present invention, when distance along the radiation surface from the center of the radiation surface facing the light source to the opening section is x, distance from the light source to the radiation side reflection unit in the radiation direction is d, opening dimension of the opening section is a, and thickness of the radiation side reflection unit is t, $$d/x<t/a$$

is preferably satisfied.

Further, in the surface illuminating light source device according to the aspect of the present invention, the opening section is preferably a circular, rectangular, annular, or discontinuous annular hole.

Further, in the surface illuminating light source device according to the aspect of the present invention, the opening section preferably has a side wall and makes light reflected on the side wall pass therethrough.

Further, in the surface illuminating light source device according to the aspect of the present invention, the radiation side reflection unit preferably has a non-through hole on the non-opening section for adjusting light reflection amount.

Further, in the surface illuminating light source device according to the aspect of the present invention, the radiation side reflection unit preferably has a narrow through groove for adjusting light reflection amount.

Further in the surface illuminating light source device according to the aspect of the present invention, the light source is preferably formed of a single light emitting diode or a combination of a plurality of light emitting diodes.

Further, in the surface illuminating light source device according to the aspect of the present invention, the casing preferably has a shape of a rectangle in a plan view.

Further in the surface illuminating light source device according to the aspect of the present invention, an interior of the casing is divided into a plurality of blocks, one point-light source is arranged at a center of the bottom plane of each divided block, and the radiation side reflection unit is arranged immediately above each of the point-light sources.

A surface illuminating device according to an aspect of the present invention is formed by arranging a plurality of surface illuminating light source devices as described above.

The outer reflection section has a non-through hole for adjusting light reflection amount arranged around the center position of the radiation surface opposite to the light source.

The opening section has a side wall and makes light reflected on the side wall pass therethrough.

The opening section has circular, rectangular, annular, or discontinuous annular holes provided along the radiation surface at a prescribed interval outwardly from the radiation surface opposite to the light source and symmetrically with respect to the center axis.

The outer reflection section has a narrow through groove for adjusting the light reflection amount.

When it is assumed that minimal distance along the radiation surface from the center of the radiation surface opposite to the light source to the opening section is x, distance from the light source to the outer reflection section in the radiation direction is d, opening dimension of the opening section is a, and the thickness of the outer reflection section is t, $$d/x<t/a$$

is satisfied.

When it is assumed that the proportion of total area of the opening section against a prescribed standard area (area of the opening section at a prescribed portion divided by the standard area) is opening rate A, b and c are invariables, and distance from the center of the radiation surface opposite to the light source is x, $$A=bx^2+c$$

is substantially satisfied.

The inner reflection means and the radiation side reflection means are formed of: one of an ultrafinely foamed reflection plate, a substance obtained by emulsifying particulates of titanium white, and particulates of polytetrafluoroethylene (poly fluoro carbon); or a combination thereof.

A surface illuminating device according to the present invention is formed by arranging a plurality of surface illuminating light source devices including: a group of light sources configured by combining one or a plurality of light radiating bodies; an optically transmissive light guide body propagating light from the light source and having a radiation surface at a prescribed position in the radiation direction; an open casing closing the light guide body except the radiation surface and having a light source arranged substantially at the center; inner reflection means arranged in the entirety of the area between the casing and the light guide body and having a reflection surface which reflects light propagating inside the light guide body; and radiation side reflection means having an outer reflection section which is arranged on the radiation surface and has a reflection surface that reflects light propagating inside the light guide body at a prescribed rate and an opening section which is formed on the outer reflection section and through which reflection light reflected at least once on one of the reflection surfaces among the light from the light source passes.

According to the present invention, uniform illuminating light is obtained on a surface at a prescribed distance from a radiation surface without increasing the thickness in a light radiation direction by using the light from the light source highly efficiently.

BEST MODE(S) FOR CARRYING OUT THE INVENTION

Exemplary embodiments of the present invention will be described with reference to the accompanying drawings.

First Embodiment

Figure 1A:
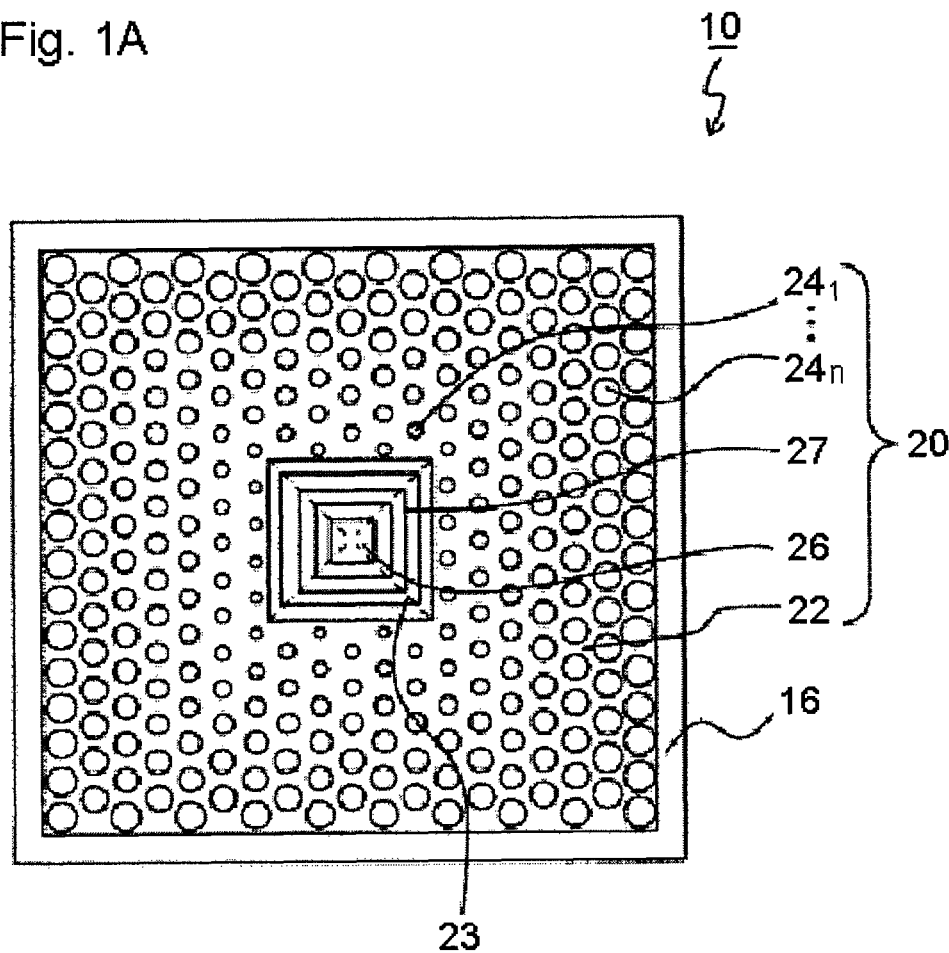
FIG. 1A is a plan view of a surface illuminating light source device according to a first embodiment.
Figure 1B:
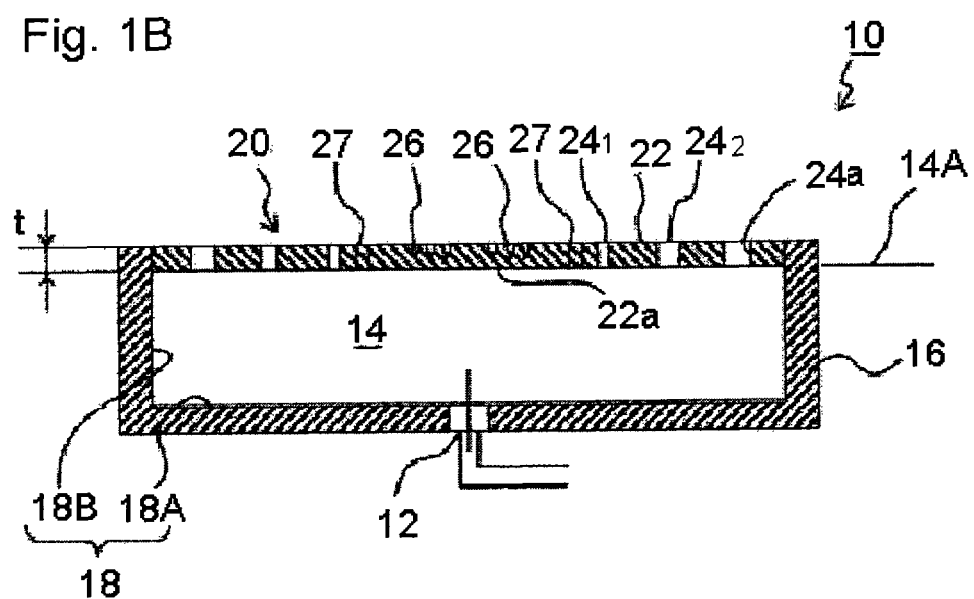
FIG. 1B is a cross sectional front view of the surface illuminating light source device.

FIGS. 1A and 1B depict a configuration of a surface illuminating light source device according to a first embodiment.

This surface illumination device 10 includes: a group of light sources 12 configured by combining one or a plurality of light radiating bodies such as light emitting diode; an optically transmissive light guide body 14 propagating light from the light source 12 and having a radiation surface 14A at a prescribed position in the radiation direction; an open casing 16 closing the light guide body 14 except the radiation surface 14A and having a light source 12 arranged substantially at the center.

In the present embodiment, as the casing 16, a cuboid of 10 cm×10 cm×1.5 cm (height) is used, for example. However, the size of the casing 16 is not limited thereto. A material forming the casing 16 is not specifically limited. For example, the casing 16 is formed of a metal or a synthetic resin.

The light guide body 14 can be formed of, for example, optical glasses. Also, highly transmissive plastics such as acrylic resin or the like or flexible and transmissive plastics such as silicon resin or the like can be used. The light guide body 14 may be gas or liquid. In the present invention, a description is given with an example of a case where the light guide body 3 is gas.

An inner reflection section 18 as an inner reflection means including a bottom reflection section 18A and a side reflection section 18B is provided in the entirety of the area between the casing 16 and the light guide body 14. A radiation side reflection section 20 as a radiation side reflection means is provided on the radiation surface 14A.

For both the inner reflection section 18 and the radiation side reflection section 20, low light absorbent materials are used. The inner reflection section 18 and the radiation side reflection section 20 are formed of: one of an ultrafinely foamed reflection plate, a substance obtained by emulsifying particulates of titanium white, and particulates of polytetrafluoroethylene (poly fluoro carbon); or a combination thereof.

The radiation side reflection section 20 has an outer reflection section 22 which is arranged on the radiation surface 14A that has a reflection surface 22a that reflects light propagating inside the light guide body 14 at a prescribed rate, and an opening section 24 which is formed on the outer reflection section 22 and through which reflection light reflected at least once on one of the reflection surfaces (such as the reflection surface 22a and inner reflection section 18) among the light from the light source 12 passes.

The outer reflection section 22 has a substantially uniform thickness t (see FIG. 1B) in the light radiation direction. In the outer reflection section 22, multiple concentric non-through holes (half-cut holes) 26 are formed at the center side of the radiation surface 14A opposite to the light source 12. Multiple narrow grooves 27 are formed at the peripheral side thereof. The multiple narrow grooves 27 are concentric with respect to the center of the reflection surface 14A and have a discontinuous annular shape (rectangular ring shape). The narrow grooves 27 are formed to be the discontinuous rectangular ring shape by non-through (half-cut) connecting section 23. Otherwise, the center side of the outer reflection section 22 alone falls off from the radiation side reflection section 20.

The non-through holes 26 and the narrow grooves 27 are provided for adjusting the reflection amount of light from the light source 12 (or the transmission amount of light).

The opening section 24 includes multiple circular holes (through holes) $24_1, 24_2, \ldots 24_n$ formed along the radiation surface 14A symmetrically with respect to the axis of the center of the radiation surface 14A opposite to the light source 12. The circular holes 24 have side walls 24a that reflect light. The light radiated from the light source 12 pass through the opening section 24 after being reflected at least once on: the bottom reflection section 18A or the side reflection section 18B of the inner reflection section 18; the reflection surface 22a of the outer reflection section 22; or the sidewall 24a. Thus, the light radiated from the light source 12 does not directly pass through the opening section 24.

Diameters of the circular holes $24_1, 24_2, \ldots 24_n$ composing the opening section 24 are not uniform. The diameters change as it gets farther from the center of the radiation surface 14A opposite to the light source 12 along the radiation surface 14A. Level of change will be described later with reference to FIG. 3.

Figure 2:
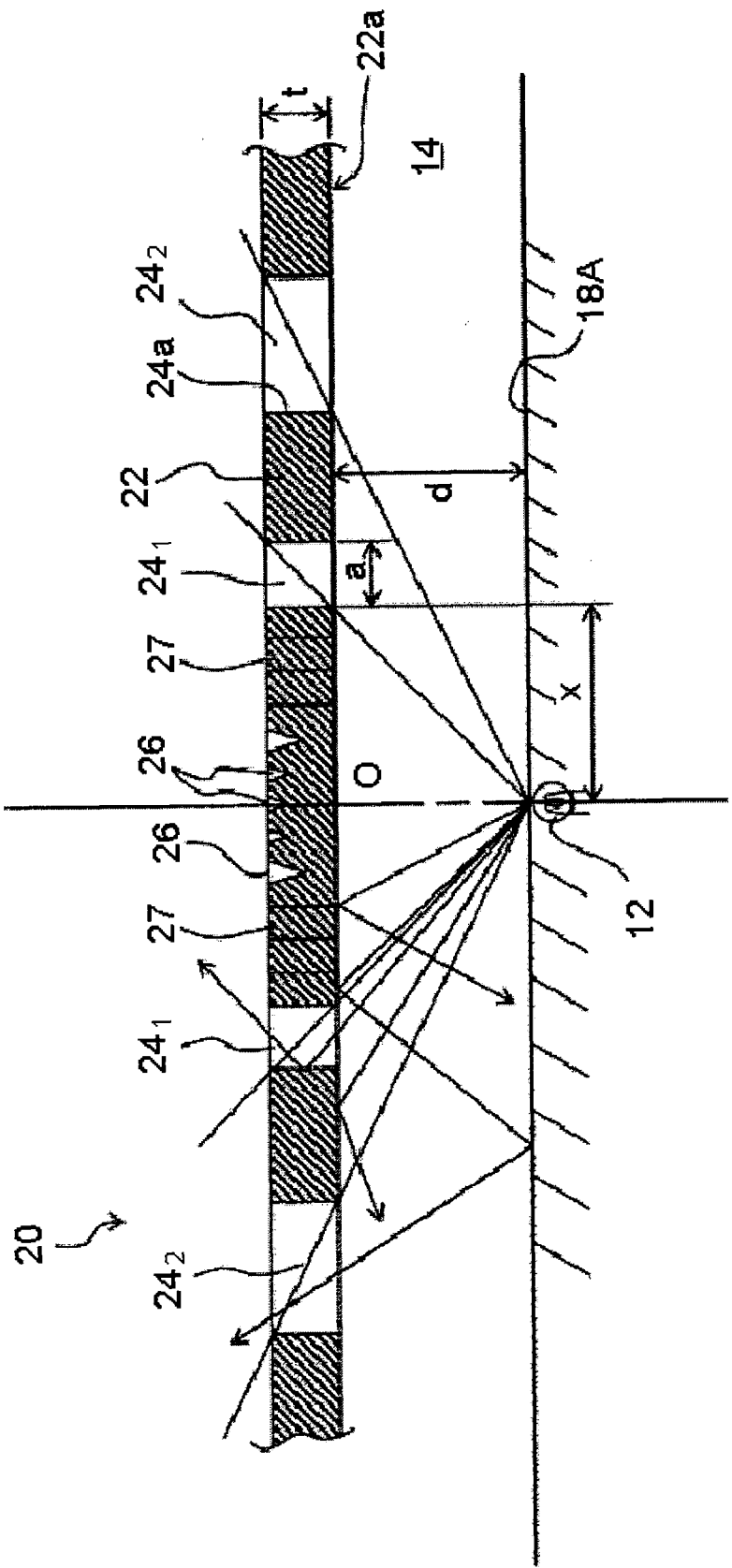
FIG. 2 is an enlarged cross sectional view of a radiation side reflection section of the surface illuminating light source device.

FIG. 2 is an enlarged cross sectional view of the radiation side reflection section 20.

The non-through holes 26 at the center side of the outer reflection section 22 are formed as a cross sectional V shaped or a cross sectional triangular recess. With the non-through holes 26, reflection amount by the outer reflection section 22 (in other words, the amount of light passing through the inside of the outer reflection section 22) is adjusted. The outer reflection section 22 has a reflection surface 22a that reflects light to the side opposite to the light source 12 at a prescribed rate. Still, the outer reflection section 22 makes a small amount of light pass therethrough. Accordingly, the light transmitting amount is adjusted by changing the thickness of the portion of the outer reflection section 22 at which the non-through holes 26 are formed.

A plurality of non-through holes 26 is formed around a center O of the radiation surface 14A opposite to the light source 12. The non-through holes 26 are formed to have the greater size and the depth as it gets farther from the center position O of the radiation surface 14a along the radiation surface 14a. The amount of light passing through the non-through holes 26 formed at the position farther from the center O are adjusted to be greater because the amount of light from the light source 12 decreases as it gets farther from the center position O due to the directionality of the light source 12 and the like.

In the present invention, a case in which the non-through holes 26 are formed at an outer surface (the surface at the reverse side of the reflection surface 22a) of the radiation side reflection surface 20 is described. Instead, the non-through holes 26 may be formed at an inner surface (the same side as the reflection surface 22a) of the radiation side reflection surface 20.

At the peripheral side of the non-through holes 26, a plurality of narrow grooves 27 is formed symmetrically with respect to the axis of the center position O of the radiation surface 14A. The narrow grooves 27 are also used to adjust the amount of light passing through the outer reflection section 22. While both non-through holes 26 and the narrow grooves 27 adjust the light reflection amount (the light transmission amount), with the narrow grooves 27, the light reflection amount (the light transmission amount) can be adjusted at a rate greater than that with the non-through holes 26.

The size and the position of the opening section 24 are so configured that the light radiated from the light source 12 does not directly pass therethrough. When the light radiated from the light source 12 directly pass through the opening section 24, flux of light passed through the radiation side reflection section 20 may become too strong making the uniformizing of the light distribution at a position distant from a radiation surface 14A for a prescribed length in a radiation direction of light difficult.

Therefore, in the present embodiment, among the light from the light source 12, only the reflection light that is reflected at least once on one of the reflection surfaces pass through the opening section 24. Accordingly, the opening section 24 is so formed on the radiation side reflection section 20 that the size and the position thereof satisfies the conditions described below.

When it is assumed that minimal distance along the radiation surface 14A from the center O of the radiation surface 14A opposite to the light source 12 to the opening section 24 is x, distance from the light source 12 to the outer reflection section 22 in the radiation direction is d, diameter of the opening section 24 is a, and the thickness of the outer reflection section 22 is t, $$d/x < t/a$$

is satisfied.

Thus, the light radiated from the light source 12 is prevented from directly passing through the opening section 24. Further, among the light radiated from the light source 12, only the reflection light is passed through that is reflected at least once on the reflection surfaces of the inner reflection section 18, the reflection surface 22a of the outer reflection section 22, or by the sidewall 24a of the opening section 24. Accordingly, with the light (reflection light) passing through the radiation side reflection section 20, the light distribution at the position distant from the radiation surface 14A for a prescribed length becomes uniform.

Further the opening section 24 is formed so as to have a larger diameter as it gets farther from the center position O of the radiation surface 14A.

Thus, when it is assumed that proportion of total area of the opening section 24 against a prescribed standard area (area of the opening section 24 at a prescribed portion divided by the standard area) is opening rate A, b and c are invariables, and distance from the center O of the radiation surface 14A opposite to the light source 12 is x, $$A = bx^2 + c$$

is substantially satisfied.

Figure 3:
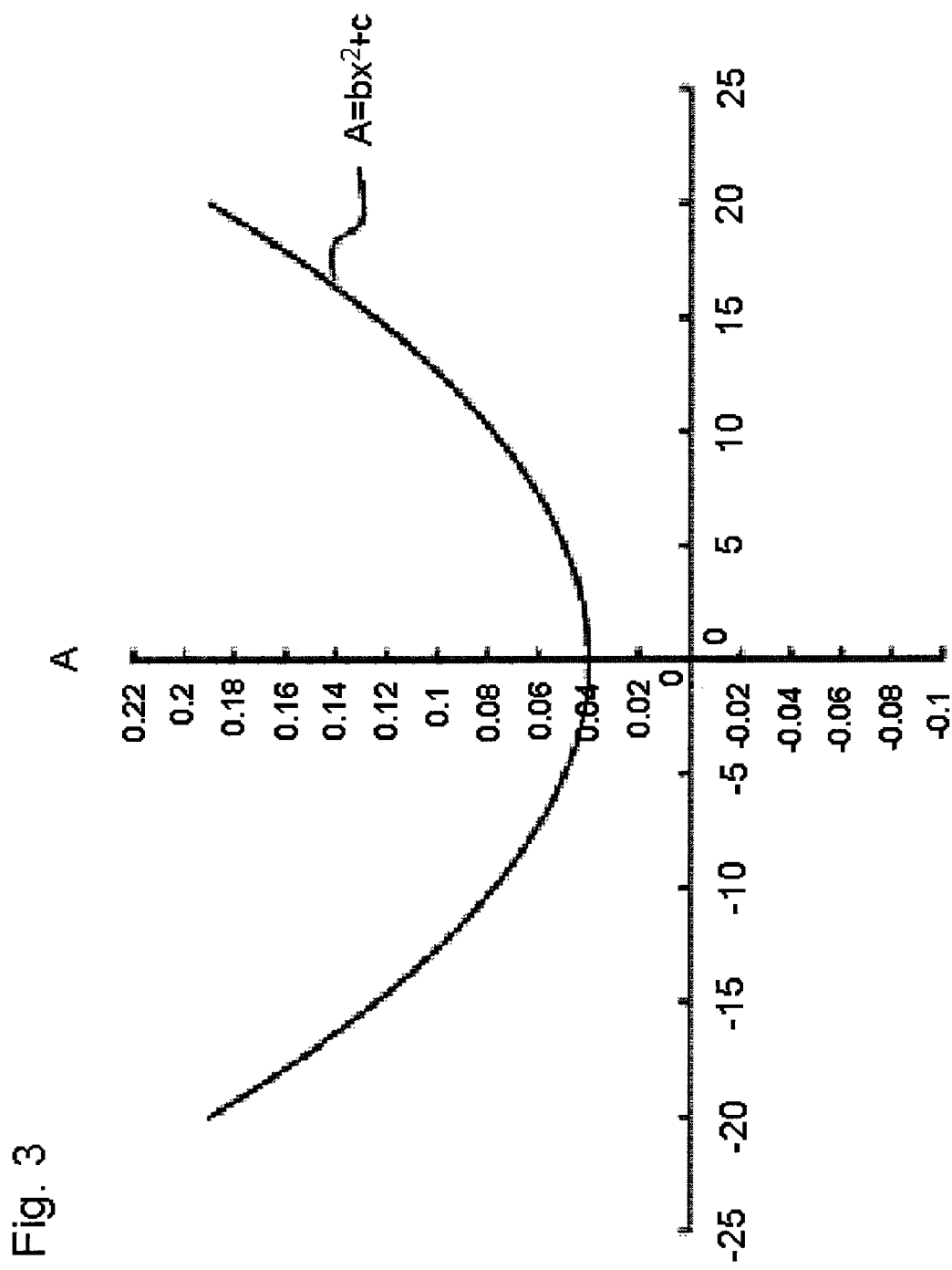
FIG. 3 is a graph depicting a curve of an opening rate of the radiation side reflection section of the surface illuminating light source device.

As shown in FIG. 3, in a graph in which the abscissa represents the distance x and the ordinate represent the opening rate A, a quadric curve is formed. An opening rate A=1 represents the fully opened condition.

In the present embodiment, as shown in FIG. 3, b=0.000375. If, for example, the non-through hole 26 is formed at the center O of the radiation surface 14A opposite to the light source 12, the invariable c is set to be c=0.04. Thus, the opening rate A=0.04 when x=0.

As shown in FIG. 3, the opening rate A increases as the square of the distance as it gets farther from the center O of the radiation surface 14A along the radiation surface 12. More specifically, as shown in FIG. 1A, as the opening section 24 are formed at the position farther from the center O of the radiation surface 14A, the size (the diameter) thereof becomes larger.

According to the present invention, the reflection light, among the light radiated from the light source 12, which is reflected at least once on one of the reflection surfaces pass through the opening section 24. Thus, the uniform illuminating light was obtained at the surface distant from the surface of the radiation side reflection section 20 in the radiation direction for a prescribed length (for example, 5 mm) or more.

Further, in the present embodiment, as the non-through holes 26 and the narrow grooves 27 are provided for adjusting the amount of reflected light in the outer reflection section 22, the uniform illuminating light can be obtained by delicately controlling the light from the light source 12.

Furthermore, as the opening rate A is defined with a mathematical expression, the size of the opening section 24 can be quantitatively set. Accordingly, the opening section 24 can easily be processed.

Second Embodiment

Figure 4:
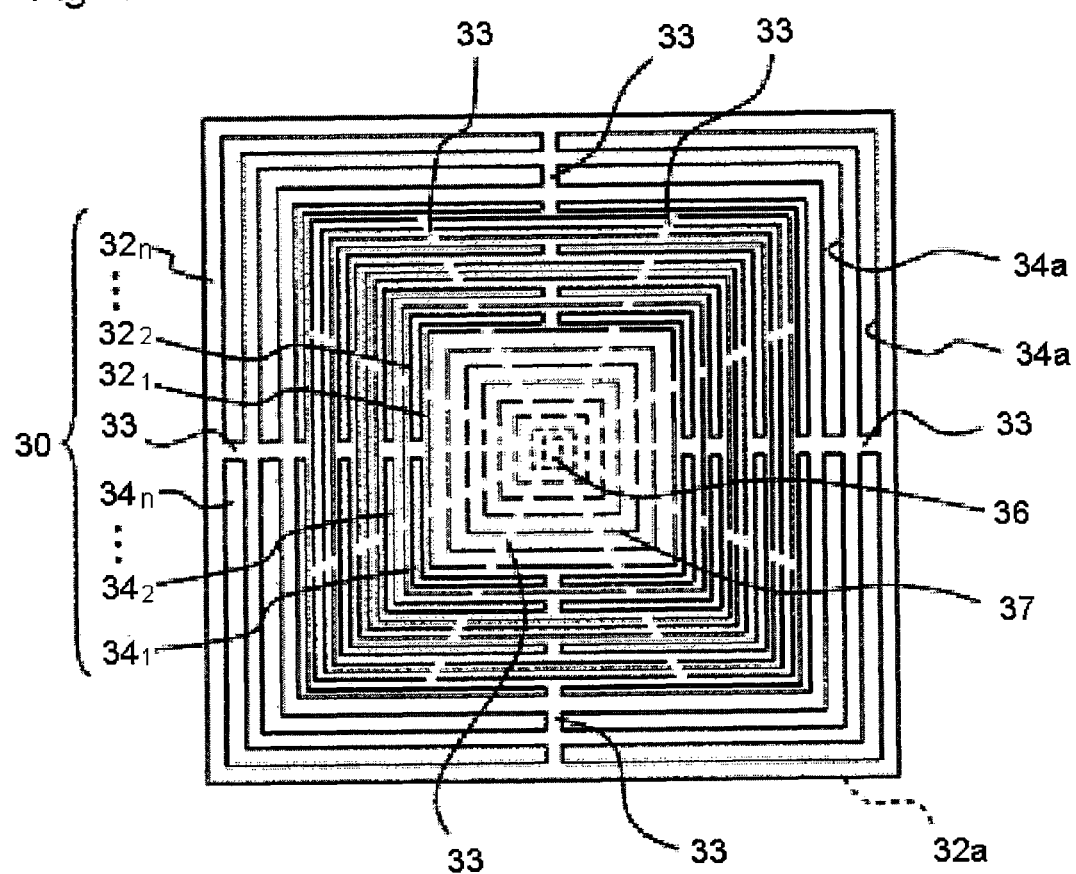
FIG. 4 is a plan view of a radiation side reflection section of a surface illuminating light source device according to a second embodiment.

FIG. 4 is a schematic depicting a configuration of a surface illuminating light source device according to a second embodiment.

In the present embodiment only a radiation side reflection section 30 is shown in the figure and the light source 12, the light guide body 14, and the casing 16 shown in FIG. 1B are omitted.

The radiation side reflection section 30 according to the present invention has an outer reflection section 32 which is arranged on the radiation surface 14A and has a reflection surface 32a that reflects light propagating inside the light guide body 14 at a prescribed rate and an opening section 34 which is formed on the outer reflection section 32 and through which reflection light reflected at least once on one of the reflection surfaces (such as the reflection surface 32 and the inner reflection section 18) among the light from the light source 12 passes.

The outer reflection section 32 has a substantially uniform thickness t (see FIG. 1B) in the radiation direction of light. In the outer reflection section 32, multiple concentric non-through holes (half-cut holes) 36 are formed at the center side of the radiation surface 14A opposite to the light source 12. Multiple narrow grooves 37 are formed at the peripheral side thereof. The multiple narrow grooves 37 are concentric with respect to the center of the reflection surface 14A and have discontinuous annular shape (rectangular rings shape). The narrow grooves 37 are formed to be the discontinuous rectangular ring shape by a connecting section 33. Otherwise, the center side of the outer reflection section 32 alone falls off from the radiation side reflection section 30.

As described above, the non-through holes 36 and the narrow grooves 37 are provided for adjusting the reflection amount of light from the light source 12 (or the light transmission amount). That is, the non-through holes 36 and the narrow grooves 37 are provided for preventing the non-uniform illumination to be produced so that the uniform illuminating light can be obtained.

The opening section 34 includes multiple rectangular ring shaped annular holes $34_1$, $34_2$, ... $34_n$ provided along the radiation surface 14A at a prescribed interval outwardly from the center of the radiation surface 14A opposite to the light source 12 and symmetrically with respect to the center axis. Diameters of the annular holes 34 are not uniform. The diameters change as it gets farther from the center of the radiation surface 14A opposite to the light source 12 along the radiation surface 14A. Level of change is described above with reference to FIG. 3. The annular holes 34 have side walls 34a that reflect light.

The light radiated from the light source 12 pass through the opening section 34 after being reflected at least once on: the bottom reflection section 18A or the side reflection section 18B of the inner reflection section 18; reflection surface 32a of the outer reflection section 32; or the sidewall 34a shown in FIG. 1B. Thus, the light radiated from the light source 12 does not directly pass through the opening section 34.

In the outer reflection section 32, a connecting section 33 is formed that connect the space between the adjacent annular holes $34_n$ and $34_{n-1}$. The connecting section 33 radially extends from the center of the radiation surface 14A. In the present invention, as the rectangular ring shaped annular holes 34 are formed symmetrically with respect to the center axis, if nothing connects the spaces therebetween, the outer reflection section 32 falls apart. To prevent such a circumstance, the connecting section 33 integrally connects the spaces.

When the position, the size, and the direction of the connecting section 33 are arbitrary set, the uniform light is difficult to be obtained. Therefore, the position, the size, and the direction of the connecting section 33 are determined from an optimal condition obtained through experiments.

Third Embodiment

Figure 5:
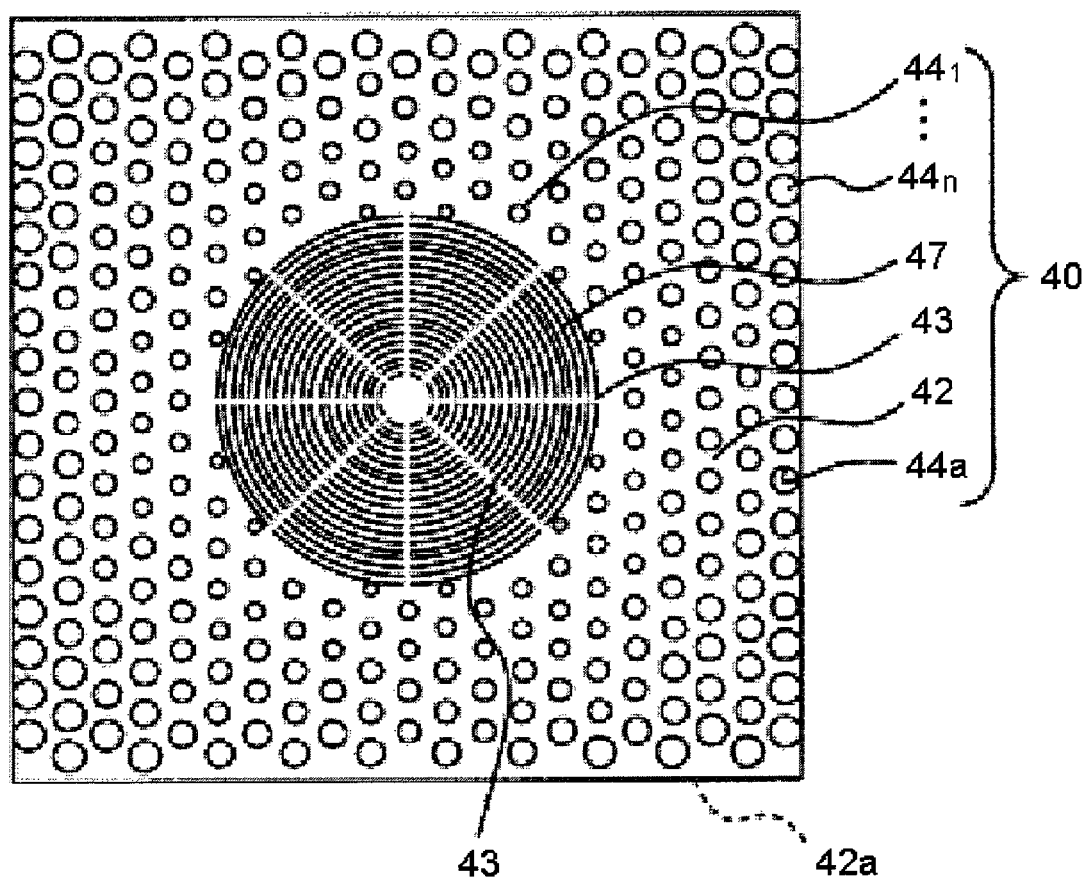
FIG. 5 is a plan view of a radiation side reflection section of a surface illuminating light source device according to a third embodiment.

FIG. 5 is a schematic depicting a configuration of a surface illuminating light source device according to a third embodiment.

In the present embodiment only a radiation side reflection section 40 is shown in the figure and the light source 12, the light guide body 14, and the casing 16 shown in FIG. 1B are omitted.

The radiation side reflection section 40 according to the present invention has an outer reflection section 42 which is arranged on the radiation surface 14A and has a reflection surface 42a that reflects light propagating inside the light guide body 14 at a prescribed rate and an opening section 44 which is formed on the outer reflection section 42 and through which reflection light reflected at least once on one of the reflection surfaces (such as the reflection surface 42a and the inner reflection section 18) among the light from the light source 12 passes.

The outer reflection section 42 has a substantially uniform thickness t (see FIG. 1B) in the radiation direction of light. In the outer reflection section 42, multiple circular-ring shaped narrow grooves 47 that are concentric, discontinuous, and narrow are formed at the center side of the radiation surface 14A opposite to the light source 12. The circular-ring shaped narrow grooves 47 are formed to be discontinuous ring shape by a connecting section 43. Otherwise, the center side of the outer reflection section 42 alone falls off from the radiation side reflection section 40.

The narrow grooves 47 are provided for adjusting the reflection amount of light (or the transmission amount of light) from the light source 12. The non-through holes (half-cut holes) may be provided at the center side of the outer reflection section 42 as needed.

The opening section 44 has multiple circular holes (through holes) $44_1, 44_2, \ldots 44_n$ provided symmetrically with respect to the axis of the center of the radiation surface 14A opposite to the light source 12. The circular holes 44 have side walls 44a that reflect light. The light radiated from the light source 12 pass through the opening section 44 after being reflected at least once on: the bottom reflection section 18A or the side reflection section 18B of the inner reflection section 18 shown in FIG. 1B; reflection surface 42a of the outer reflection section 42; or the sidewall 44a. Thus, the light emitted from the light source 12 does not directly pass through the opening section 44.

Diameters of the circular holes $44_1, 44_2, \ldots 44_n$ composing the opening section 24 are not uniform. The diameters change as it gets farther from the center of the radiation surface 14A opposite to the light source 12 along the radiation surface 14A. Level of change is described above with reference to FIG. 3.

In the embodiments described above, the opening sections 24, 34, and 44 are circular holes or continuous or discontinuous rectangular-ring shaped annular holes. However, the shape is not limited thereto. The opening sections 24, 34, and 44 may shaped to be, for example, a square hole or a circular-ring shaped annular hole.

Fourth Embodiment

Figure 6:
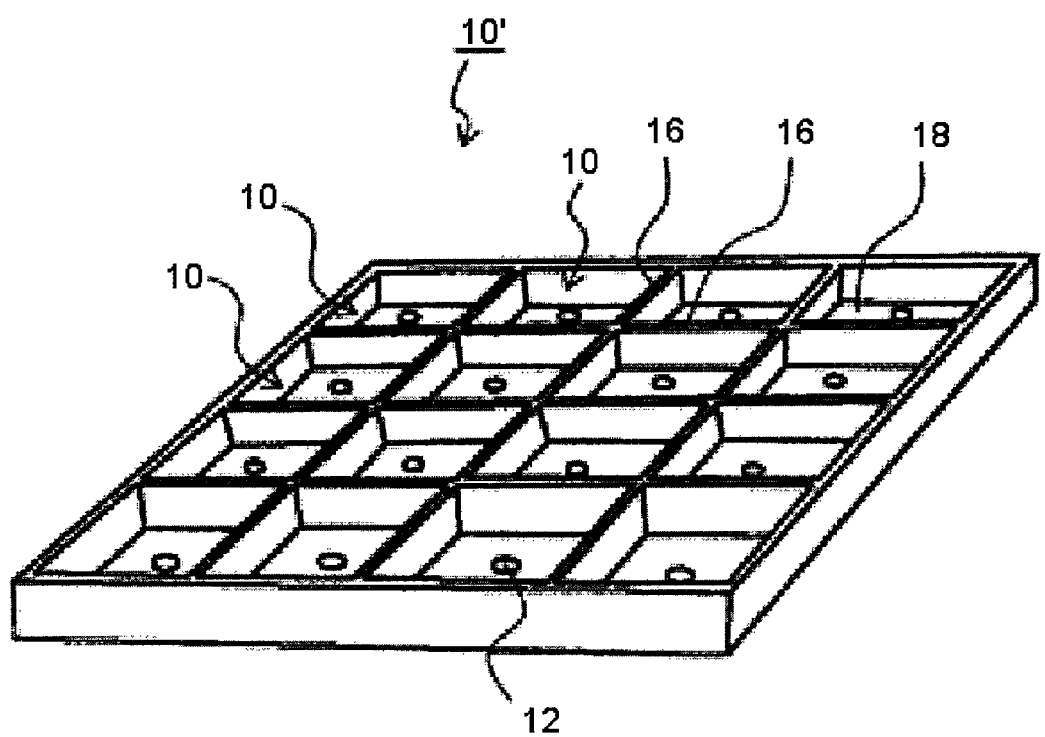
FIG. 6 is a schematic perspective view of an appearance of a surface illuminating device.

FIG. 6 is a diagram depicting an embodiment of a surface illuminating device 10' that is configured by arranging a plurality of surface illuminating light source devices 10. Elements similar or corresponding to that of FIG. 1 are given the same reference numerals.

In the surface illuminating device 10', for the easier understanding, the radiation side reflection section 20 is omitted from the drawing. In effect, the radiation side reflection section 20 is formed on each surface illuminating light source device 10.

According to the present embodiment, an area of uniform illuminating light can be arbitrary enlarged that is obtained at a surface distant in a radiating direction of light for a prescribed length from the radiation surface 14A of each surface illuminating light source device 10. Thus, with a matrix arrangement of a plurality of surface illumination light source devices 10, the area in which the uniform illuminating light is obtained can be of desired range.

The invention claimed is:

1. A surface illuminating light source device comprising:
a group of light sources including a single point-light source or a combination of a plurality of point-light sources that emit light;
an optically transmissive light guide body propagating light from the light source and having a radiation surface at a prescribed position in the radiation direction;
a casing closing surfaces of the light guide body except the radiation surface and having an inner reflection unit formed of a bottom surface and a side reflection section that reflect light, in which the light source is arranged substantially at a center of the bottom surface; and
a radiation side reflection unit arranged on the radiation surface, wherein
the radiation side reflection unit is formed of a member that reflects or passes light propagating inside the light guide body at a prescribed rate, and
an opening section is formed on a periphery of the radiation side reflection unit while a central portion of the radiation side reflection unit is a non-opening section so that an amount of light passing through the radiation side reflection unit increases as it gets farther from a center of the radiation surface facing the light source,
wherein when proportion of total area of the opening section against a prescribed standard area is opening rate A, b and c are invariables, and distance from a center of the radiation surface facing the light source is x, the opening section satisfies the following formula:

$A = bx^2 + c.$

2. The surface illuminating light source device according to claim 1, wherein the opening section has a larger area as it gets farther from the non-opening section.

3. The surface illuminating light source device according to claim 1, wherein the light guide body is air.

4. The surface illuminating light source device according to claim 1, wherein the inner reflection unit and the radiation side reflection unit are formed of an ultrafinely foamed reflection plate.

5. The surface illuminating light source device according to claim 1, wherein the opening section is a circular, rectangular, annular, or discontinuous annular hole.

6. The surface illuminating light source device according to claim 1, wherein the opening section has a side wall and makes light reflected on the side wall pass therethrough.

7. The surface illuminating light source device according to claim 1, wherein the radiation side reflection unit has a non-through hole on the non-opening section for adjusting light reflection amount.

8. The surface illuminating light source device according to claim 1, wherein the radiation side reflection unit has a narrow through groove for adjusting light reflection amount.

9. The surface illuminating light source device according to claim 1, wherein the light source is formed of a single light emitting diode or a combination of a plurality of light emitting diodes.

10. The surface illuminating light source device according to claim 1, wherein the casing has a shape of a rectangle in a plan view.

11. The surface illuminating light source device according to claim 1, wherein an interior of the casing is divided into a plurality of blocks, single point-light source is arranged at a center of the bottom plane of each divided block, and the radiation side reflection unit is arranged immediately above each of the point-light sources.

12. A surface illuminating light source device comprising:
a group of light sources including a single point-light source or a combination of a plurality of point-light sources that emit light;
an optically transmissive light guide body propagating light from the light source and having a radiation surface at a prescribed position in the radiation direction;
a casing closing surfaces of the light guide body except the radiation surface and having an inner reflection unit formed of a bottom surface and a side reflection section that reflect light, in which the light source is arranged substantially at a center of the bottom surface; and
a radiation side reflection unit arranged on the radiation surface, wherein
the radiation side reflection unit is formed of a member that reflects or passes light propagating inside the light guide body at a prescribed rate, and
an opening section is formed on a periphery of the radiation side reflection unit while a central portion of the radiation side reflection unit is a non-opening section so that an amount of light passing through the radiation side reflection unit increases as it gets farther from a center of the radiation surface facing the light source,
wherein when distance along the radiation surface from the center of the radiation surface facing the light source to the opening section is x, distance from the light source to the radiation side reflection unit in the radiation direction is d, opening dimension of the opening section is a, and thickness of the radiation side reflection unit is t, $d/x < t/a$ is satisfied.

13. A surface illuminating device comprising:
an arrangement including a plurality of surface illuminating light source devices, wherein at least one of the plurality of surface illuminating light source devices includes:
a group of light sources including a single point-light source or a combination of a plurality of point-light sources that emit light;
an optically transmissive light guide body propagating light from the light source and having a radiation surface at a prescribed position in the radiation direction;
a casing closing surfaces of the light guide body except the radiation surface and having an inner reflection unit formed of a bottom surface and a side reflection section that reflect light, in which the light source is arranged substantially at a center of the bottom surface; and
a radiation side reflection unit arranged on the radiation surface, wherein
the radiation side reflection unit is formed of a member that reflects or passes light propagating inside the light guide body at a prescribed rate, and
an opening section is formed on a periphery of the radiation side reflection unit while a central portion of the radiation side reflection unit is a non-opening section so that an amount of light passing through the radiation side reflection unit increases as it gets farther from a center of the radiation surface facing the light source,
wherein when proportion of total area of the opening section against a prescribed standard area is opening rate A, b and c are invariables, and distance from a center of the radiation surface facing the light source is x, the opening section satisfies the following formula:
$A = bx^2 + c.$

* * * * *